(12) United States Patent
Huang et al.

(10) Patent No.: US 12,455,460 B2
(45) Date of Patent: Oct. 28, 2025

(54) OPEN BINOCULAR NEAR-EYE DISPLAY DEVICE WITH ADJUSTABLE PUPILLARY DISTANCE

(71) Applicant: Shenzhen NED Optics Co.,Ltd., Shenzhen (CN)

(72) Inventors: Youyong Huang, Shenzhen (CN); Chong Wang, Shenzhen (CN); Donghua Liu, Shenzhen (CN); Huajun Peng, Shenzhen (CN)

(73) Assignee: Shenzhen NED Optics Co., Ltd., Shenzhen (CN)

( * ) Notice: Subject to any disclaimer, the term of this patent is extended or adjusted under 35 U.S.C. 154(b) by 0 days.

(21) Appl. No.: 19/047,316

(22) Filed: Feb. 6, 2025

(65) Prior Publication Data

US 2025/0244592 A1 Jul. 31, 2025

(30) Foreign Application Priority Data

Jan. 31, 2024 (CN) .......................... 202410131234.3

(51) Int. Cl.
G02B 27/01 (2006.01)
(52) U.S. Cl.
CPC ..... G02B 27/0176 (2013.01); G02B 27/0101 (2013.01); G02B 2027/0134 (2013.01)
(58) Field of Classification Search
CPC .............. G02B 27/017; G02B 27/0176; G02B 27/0101; G02B 2027/0134
See application file for complete search history.

(56) References Cited

U.S. PATENT DOCUMENTS

| 5,954,642 | A | * | 9/1999 | Johnson | ............. | G02B 27/0176 600/300 |
| 6,480,174 | B1 | * | 11/2002 | Kaufmann | ......... | G02B 27/0172 359/13 |
| 8,355,208 | B1 | * | 1/2013 | Baker | ................ | G02B 27/0176 359/630 |
| 10,386,647 | B1 | * | 8/2019 | Yu | ........................ | G02B 27/028 |

(Continued)

FOREIGN PATENT DOCUMENTS

| CN | 205844634 U | * | 12/2016 |
| CN | 207965363 U | | 10/2018 |
| CN | 109599001 A | * | 4/2019 |

*Primary Examiner* — Cory A Almeida
(74) *Attorney, Agent, or Firm* — Nitin Kaushik

(57) ABSTRACT

The present invention relates to an open binocular near-eye display device with an adjustable pupillary distance, including a binocular display host allowing both eyes to simultaneously view enlarged pictures. The binocular display host includes a middle frame component, a fixed bracket, a left optical machine fixing frame, and a right optical machine fixing frame. The middle frame component is provided with a fixing portion connected to the fixed bracket, and position-limiting portions are arranged on both sides of the fixing portion. The fixing portion is provided with an adjustment gap. The middle frame component is provided with a sliding component, and the fixed bracket is provided with an adjustment knob. The left optical machine fixing frame and the right optical machine fixing frame are each provided with a rack, and the two racks are both engaged with a driving gear and are located on both sides of the driving gear.

7 Claims, 13 Drawing Sheets

(56) References Cited

U.S. PATENT DOCUMENTS

| | | | |
|---|---|---|---|
| 2015/0103306 A1* | 4/2015 | Kaji | G02C 5/08 |
| | | | 351/128 |
| 2016/0246059 A1* | 8/2016 | Halpin | G02B 27/0176 |
| 2018/0338130 A1* | 11/2018 | Miller | H04N 13/327 |
| 2019/0159354 A1* | 5/2019 | Zheng | H05K 5/0217 |
| 2021/0080746 A1* | 3/2021 | Mirabella | G02B 27/0172 |
| 2022/0011583 A1* | 1/2022 | Liu | G02B 3/02 |
| 2024/0389247 A1* | 11/2024 | Chintapatla | G02B 27/0176 |

* cited by examiner

OPEN BINOCULAR NEAR-EYE DISPLAY DEVICE WITH ADJUSTABLE PUPILLARY DISTANCE

CROSS-REFERENCE TO RELATED APPLICATIONS

The application claims priority to Chinese patent application No. 202410131234.3, filed on Jan. 31, 2024, the entire contents of which are incorporated herein by reference.

TECHNICAL FIELD

The present invention relates to the field of open near-eye display technologies, and more specifically, to an open binocular near-eye display device with an adjustable pupillary distance.

BACKGROUND

Augmented reality (AR) and virtual reality (VR), as well as the currently popular virtual sensory interaction technology, have gradually been applied in industries such as entertainment, education, and healthcare. At present, a main platform device for implementing the AR/VR technology is Near-eye display (NED). The NED uses the optical technology to guide video image light emitted by a micro image display (such as a transmissive or reflective liquid crystal display, an organic electroluminescent device, and a DMD device) to pupils of a user, thereby achieving virtual and enlarged images within a near-eye range of the user, and providing the user with intuitive and visual images, videos, and text information.

The existing near-eye display devices are generally classified into two types: closed and open.

Closed near-eye display devices are more common, which have functions such as watching movies, games, and entertainment. The device displays images to both eyes of a wearer in a closed visual environment. The near-eye display device in this form is limited in its application and experience due to the fact that the eyes of the user cannot view external pictures at any time while viewing pictures in the closed visual environment.

A near-eye display device in another form displays images to a single eye of a wearer in an open visual environment. When the wearer uses it, he/she needs to change his/her habit of using eyes. Only when the other eye is closed can the wearer see a picture displayed by a single-side display. Moreover, the position of the single-side display cannot block a visual center of the wearer, and the area of the display cannot be too large; therefore, these factors all bring difficulties to its wearing and use.

There is a near-eye display device in still another form that displays images to both eyes of a wearer in an open visual environment. For example, Chinese invention patent No. CN105511081A discloses a head-mounted binocular display device, including: two displays arranged respectively relative to both eyes of a wearer, and the two displays are arranged at positions offset 5° to 30° upward relative to a horizontal plane of a binocular line of sight; and structures such as two sets of optical elements that are arranged separately relative to the two displays to enlarge images displayed on the displays.

Chinese invention patent No. CN 211928304U discloses a near-eye display device and a near-eye display glasses assembly, including: at least one projection optical device for projecting images; a pair of optical display lenses for displaying the images projected through the projection optical device; and a near-eye display glasses frame, where the projection optical device and the optical display lenses are correspondingly mounted on the near-eye display glasses frame, and the near-eye display glasses frame is provided with structures such as a nose pad mounting portion and a glasses holding mechanism.

At present, in the above open near-eye display devices, the conventional design solution is wrapping an optical machine by a main housing, and the optical machine translates axially along an actuating axis on the main housing: i) it often causes a bulky volume around the glasses body, resulting in a difficulty in lightweighting; ii) the structure of a pupillary distance adjustment structure is complex; iii) a multi-layer composite frame structure results in a high manufacturing cost and a high difficulty; and iv) the complement angle of the field of view on both sides of the optical machine will be blocked by the main housing of the glasses, so that it is impossible to perceive the surrounding environment.

SUMMARY

The technical problem to be solved by the present invention is to provide an open binocular near-eye display device with an adjustable pupillary distance, in response to the above defects of the prior art.

To solve the technical problems, the present invention adopts the following technical solution:

an open binocular near-eye display device with an adjustable pupillary distance is constructed, including a binocular display host for both eyes to simultaneously view enlarged pictures, and a forehead support component in contact with the human forehead for wearing and fixing; and further including a flip connection mechanism connecting the binocular display host and the forehead support component, and allowing the binocular display host to be in an open state with the human face during use; where the binocular display host includes:

a mounting base, a left optical machine fixing frame, and a right optical machine fixing frame, where two ends of the mounting base are respectively provided with a first mounting position and a second mounting position for movably mounting the left optical machine fixing frame and the right optical machine fixing frame, and the mounting base is provided with a distance adjustment component for adjusting a distance between the left optical machine fixing frame and the right optical machine fixing frame.

In the open binocular near-eye display device with an adjustable pupillary distance according to the present invention, the mounting base includes a middle frame component and a fixed bracket; the middle frame component is provided with a fixing portion connected to the fixed bracket, position-limiting portions are arranged on both sides of the fixing portion, and the fixing portion is combined with the two position-limiting portions respectively to form the first mounting position that cooperates with the left optical machine fixing frame and the second mounting position that cooperates with the right optical machine fixing frame;

the fixing portion is provided with an adjustment gap, or an adjustment gap is reserved between the fixed bracket and the fixing portion;

the middle frame component is provided with a sliding component that slidably connects the left optical machine fixing frame and the right optical machine fixing frame, the fixed bracket is provided with a driving gear that extends into the adjustment gap and an adjustment knob that adjusts rotation of the driving gear, the left optical machine fixing frame and the right optical machine fixing frame are each provided with a rack that extends into the adjustment gap, and the two racks are both engaged with the driving gear and are located on both sides of the driving gear; and the sliding component, the driving gear, the adjustment knob, and the two racks constitute the distance adjustment component.

In the open binocular near-eye display device with an adjustable pupillary distance according to the present invention, the middle frame component is fixed with a pupillary distance locking rack, and the left optical machine fixing frame or the right optical machine fixing frame is provided with a pupillary distance locking pressure plate and a pupillary distance locking adjustment component that adjusts and switches a clutch state between the pupillary distance locking pressure plate and the pupillary distance locking rack; and the pupillary distance locking pressure plate is provided with a tooth slot that is engaged with the pupillary distance locking rack.

In the open binocular near-eye display device with an adjustable pupillary distance according to the present invention, one side surface of the pupillary distance locking pressure plate is provided with the tooth slot, and the other side surface thereof is provided with a guide slot; an inner bottom of the guide slot is provided with two first steps, and the two first steps are connected by a first inclined surface; the pupillary distance locking adjustment component includes a sliding piece, the sliding piece is provided with a driving head that matches the guide slot, the driving head is provided with two second steps, the second steps correspondingly match the first steps, and the two second steps are connected by a second inclined surface; and the pupillary distance locking adjustment component further includes a reset shrapnel for resetting the pupillary distance locking pressure plate.

In the open binocular near-eye display device with an adjustable pupillary distance according to the present invention, both sides of the pupillary distance locking pressure plate are each provided with a connecting rod; an open slot for accommodating the pupillary distance locking pressure plate is arranged on an elastic action end of the reset shrapnel, both sides of the open slot are connected to the two connecting rods respectively, and the tooth slot is located below the reset shrapnel In the open binocular near-eye display device with an adjustable pupillary distance according to the present invention, a chute component is arranged on the left optical machine fixing frame or the right optical machine fixing frame, and a chute slidably connecting the sliding piece is arranged on the chute component; both sides of the sliding piece are each provided with a sliding protrusion strip, and an inner wall of the chute is provided with guide slots that cooperate with the sliding protrusion strips.

In the open binocular near-eye display device with an adjustable pupillary distance according to the present invention, the reset shrapnel is connected to the chute component in a clamping manner; a tail end of the sliding piece is provided with an elastic hook, and a front end of the elastic hook has an orientation consistent with that of a front end of the sliding piece; the chute component is provided with a hook slot that matches the elastic hook, and a position-limiting slot that matches the elastic hook for position-limiting is arranged inside the hook slot.

In the open binocular near-eye display device with an adjustable pupillary distance according to the present invention, the left optical machine fixing frame and the right optical machine fixing frame are each provided with a mounting slot position for mounting the optical machine component, and the mounting slot position is arranged near an opening on one side of the fixed bracket; and the two position-limiting portions correspondingly extend into openings of the two mounting slot positions, respectively.

In the open binocular near-eye display device with an adjustable pupillary distance according to the present invention, the sliding component includes a plurality of parallel guide shafts, the guide shafts penetrate through the middle frame component, and both the left optical machine fixing frame and the right optical machine fixing frame are provided with guide shaft sleeves or guide holes that cooperate with the guide shafts.

In the open binocular near-eye display device with an adjustable pupillary distance according to the present invention, the fixed bracket is provided with a left position-limiting column and a right position-limiting column; the left optical machine fixing frame is provided with a left position-limiting slot that cooperates with the left position-limiting column, and the right optical machine fixing frame is provided with a right position-limiting slot that cooperates with the right position-limiting column.

The beneficial effects of the present invention are as follows: in open binocular near-eye display glasses, a fixing portion and two position-limiting portions are combined to form a middle frame component, and a first mounting position that cooperates with a left optical machine fixing frame and a second mounting position that cooperates with a right optical machine fixing frame are formed by combining the fixing portion with the two position-limiting portions, respectively. After mounting optical machines on the left optical machine fixing frame and the right optical machine fixing frame respectively, the complement angle of the field of view on both sides of the optical machine will not be blocked by a main housing of the glasses, and the surrounding environment can be perceived, thereby realizing the open binocular near-eye display function, simplifying the frame structure of the device, reducing production costs and overall weight, and having a small volume. In addition, an adjustment knob on a fixed bracket can be used to conveniently synchronize pupillary distances of the two optical machines.

BRIEF DESCRIPTION OF THE DRAWINGS

In order to illustrate the embodiments of the present invention or the technical solutions in the prior art more clearly, the present invention will be further explained in conjunction with the accompanying drawings and embodiments. The accompanying drawings described below are only partial embodiments of the present invention. For those of ordinary skill in the art, other drawings can be obtained based on these drawings without creative efforts.

DETAILED DESCRIPTION OF THE EMBODIMENTS

In order to make objectives, technical solutions and advantages of the embodiments of the present invention clearer, a clear and complete description will be made below with reference to the technical solutions in the embodiments of the present application. It is apparent that the described embodiments are a part of, rather than all, embodiments of the present invention. Based on the embodiments of the present invention, all other embodiments derived by those of ordinary skill in the art without any creative efforts fall within the claimed scope of the present invention.

Figure 1:
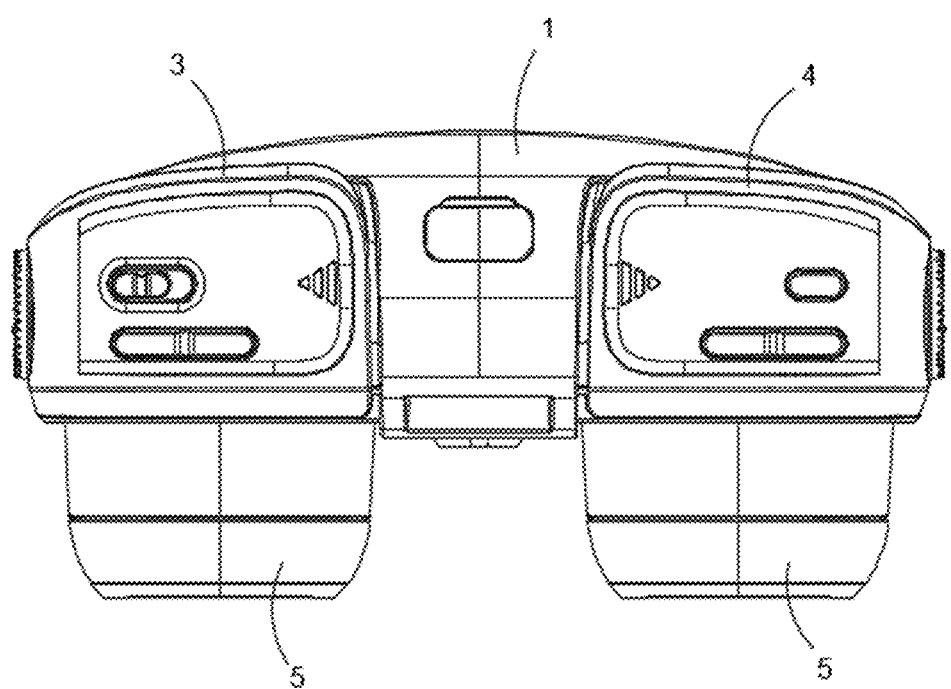
FIG. 1 is a schematic structural diagram of an open binocular near-eye display device with an adjustable pupillary distance when the pupillary distance is adjusted to the minimum distance, according to a preferred embodiment of the present invention.
Figure 2:
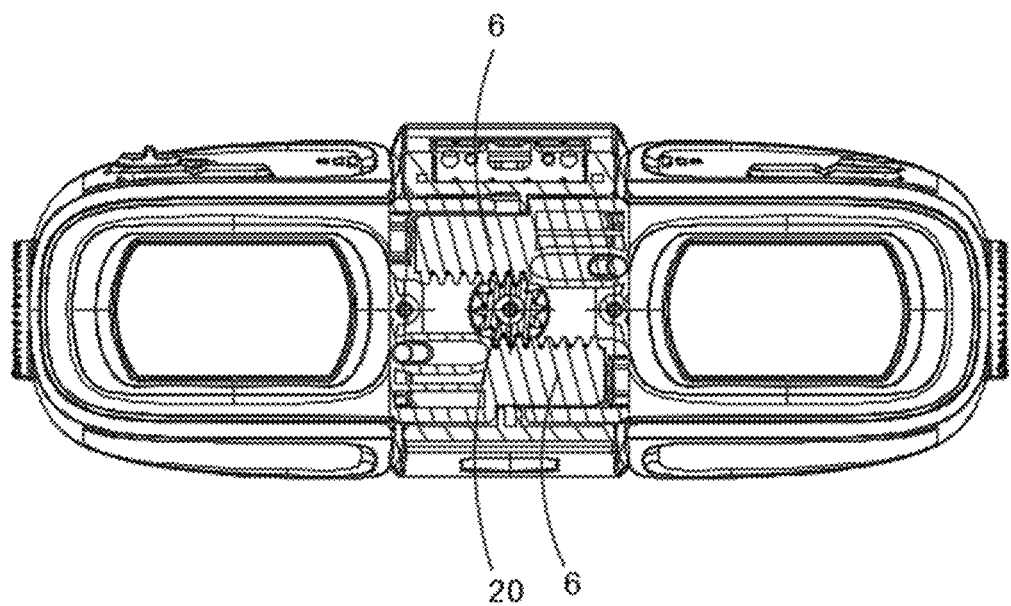
FIG. 2 is a sectional diagram of an open binocular near-eye display device with an adjustable pupillary distance when the pupillary distance is adjusted to the minimum distance, according to a preferred embodiment of the present invention.
Figure 3:
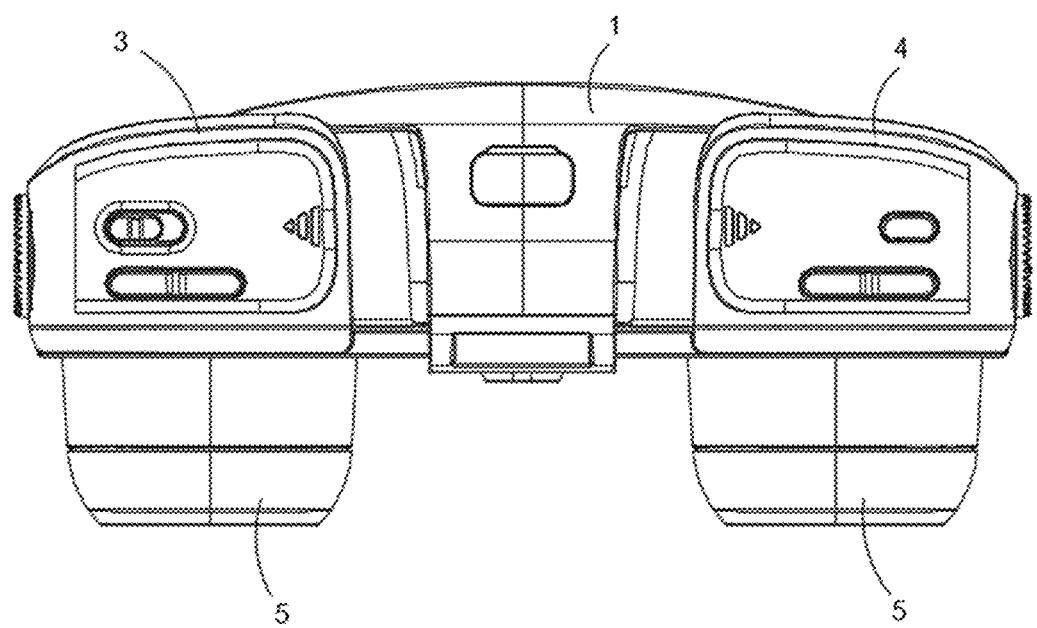
FIG. 3 is a schematic structural diagram of an open binocular near-eye display device with an adjustable pupillary distance when the pupillary distance is adjusted to the maximum distance, according to a preferred embodiment of the present invention.
Figure 4:
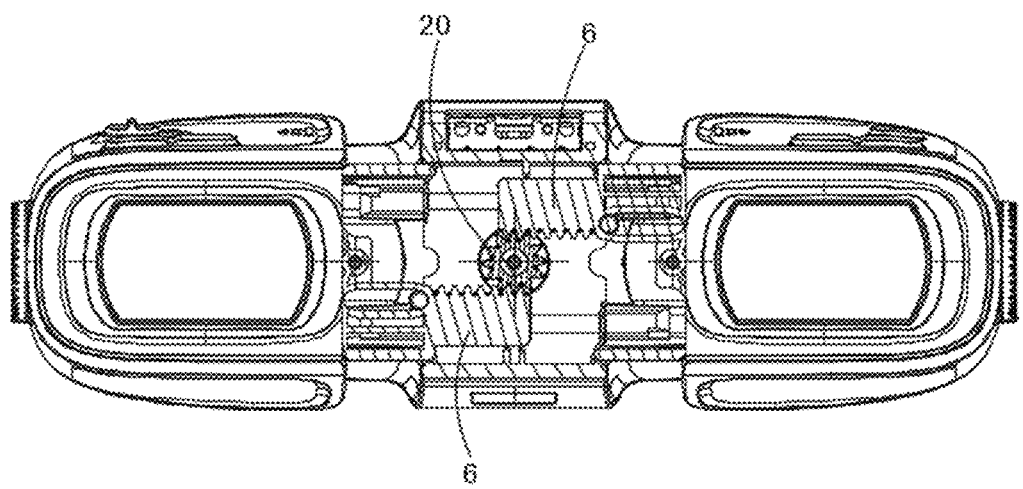
FIG. 4 is a sectional diagram of an open binocular near-eye display device with an adjustable pupillary distance when the pupillary distance is adjusted to the maximum distance, according to a preferred embodiment of the present invention.
Figure 5:
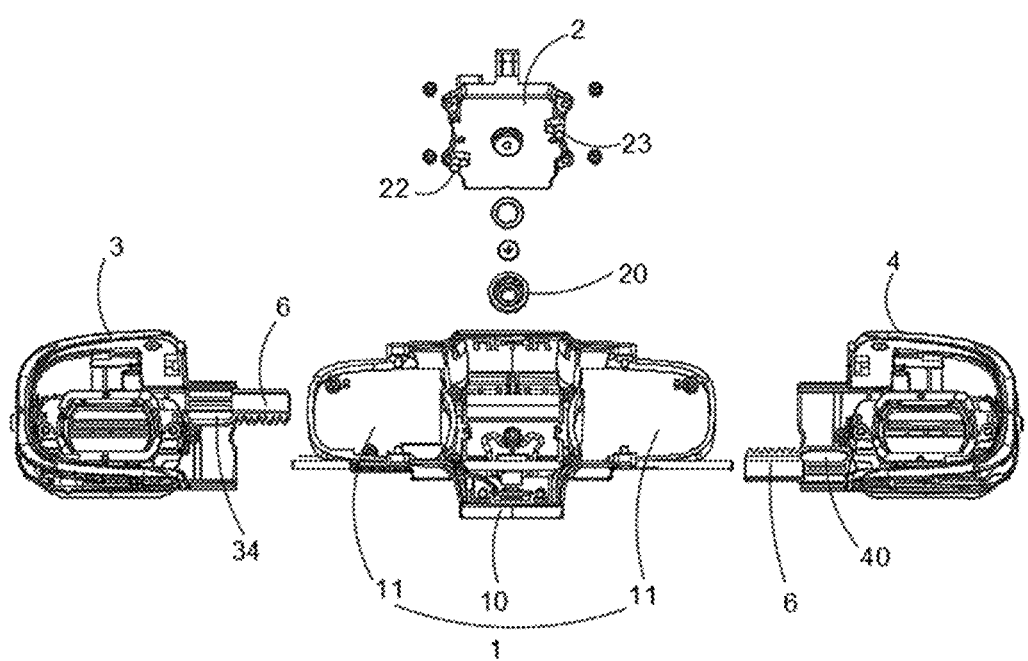
FIG. 5 is an exploded diagram of a middle frame component, a fixed bracket, a left optical machine fixing frame, and a right optical machine fixing frame of an open binocular near-eye display device with an adjustable pupillary distance according to a preferred embodiment of the present invention.
Figure 6:
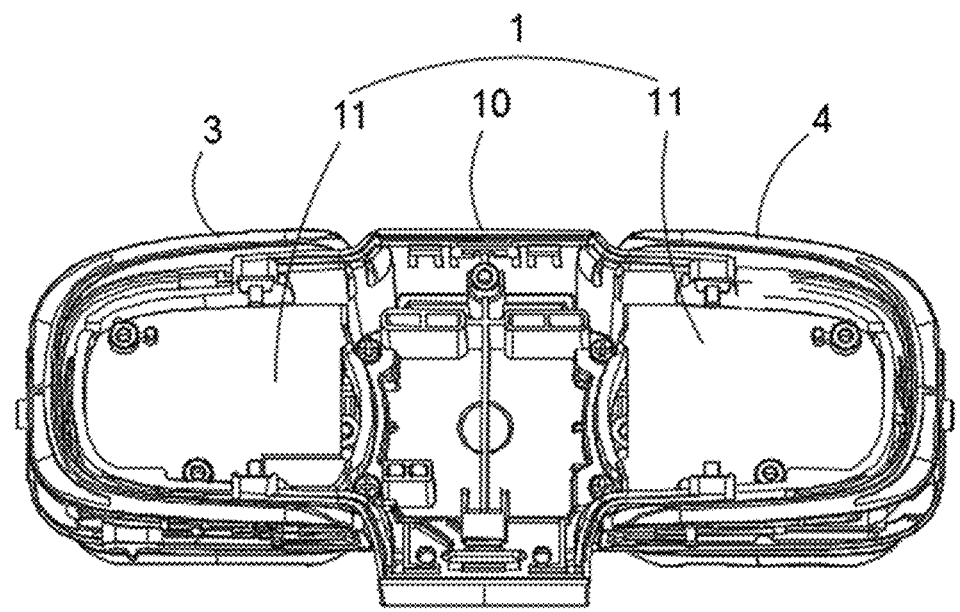
FIG. 6 is a schematic structural diagram of a middle frame component, a fixed bracket, a left optical machine fixing frame, and a right optical machine fixing frame of an open binocular near-eye display device with an adjustable pupillary distance after assembling, according to a preferred embodiment of the present invention.
Figure 7:
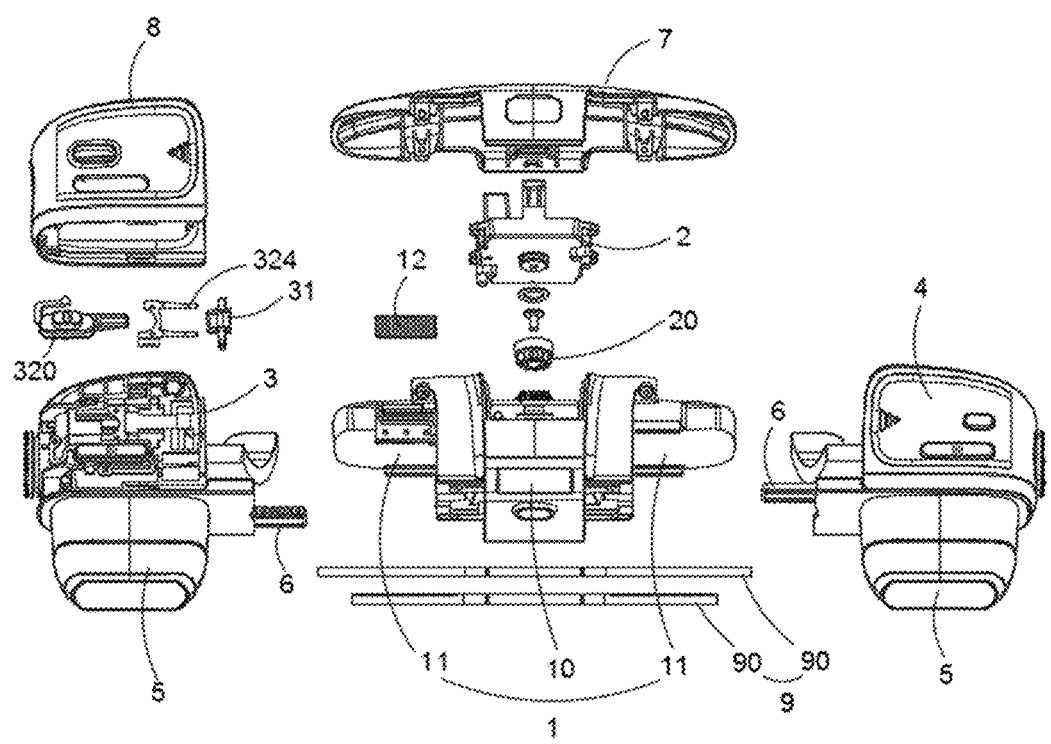
FIG. 7 is an exploded diagram of an open binocular near-eye display device with an adjustable pupillary distance according to a preferred embodiment of the present invention.
Figure 8:
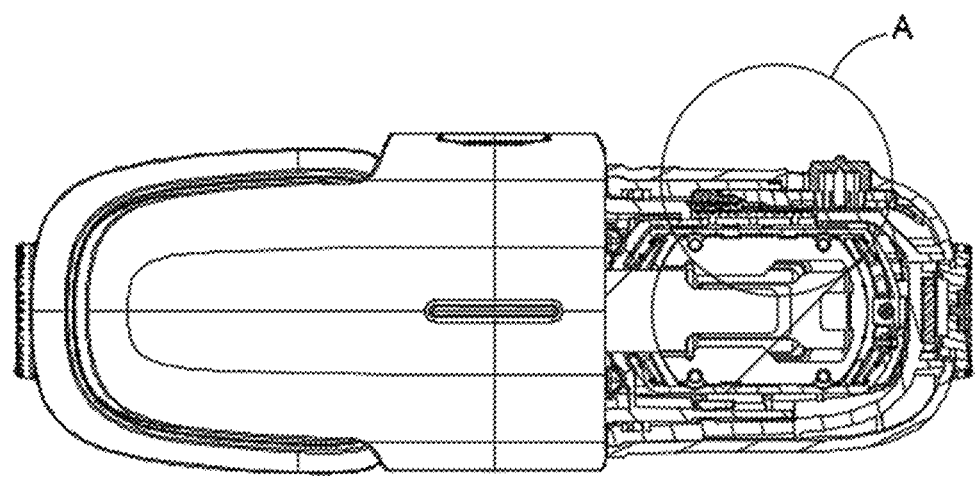
FIG. 8 is a partial sectional diagram of a locked state of a pupillary distance locking pressure plate and a pupillary distance locking rack of an open binocular near-eye display device with an adjustable pupillary distance according to a preferred embodiment of the present invention.
Figure 9:
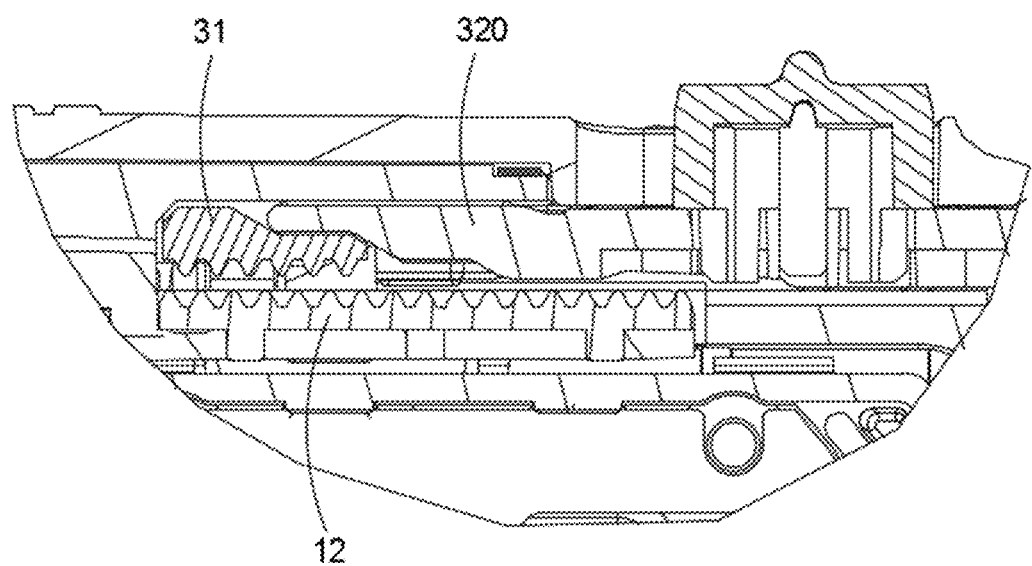
FIG. 9 is a schematic enlarged diagram of A in FIG. 8.
Figure 10:
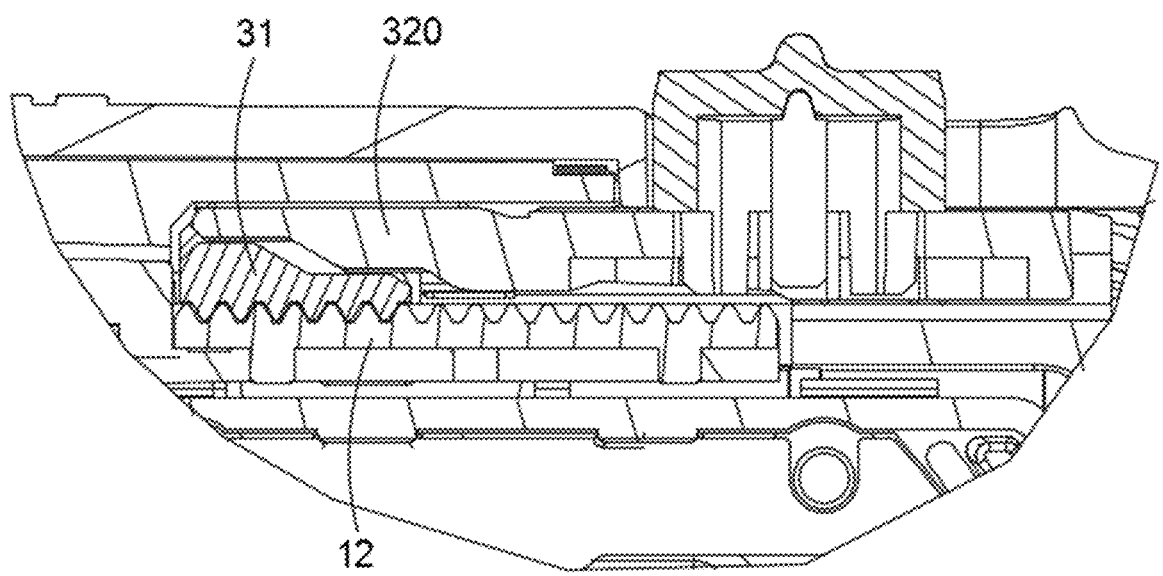
FIG. 10 is a partially enlarged schematic diagram of an unlocked state of a pupillary distance locking pressure plate and a pupillary distance locking rack of an open binocular near-eye display device with an adjustable pupillary distance according to a preferred embodiment of the present invention.
Figure 11:
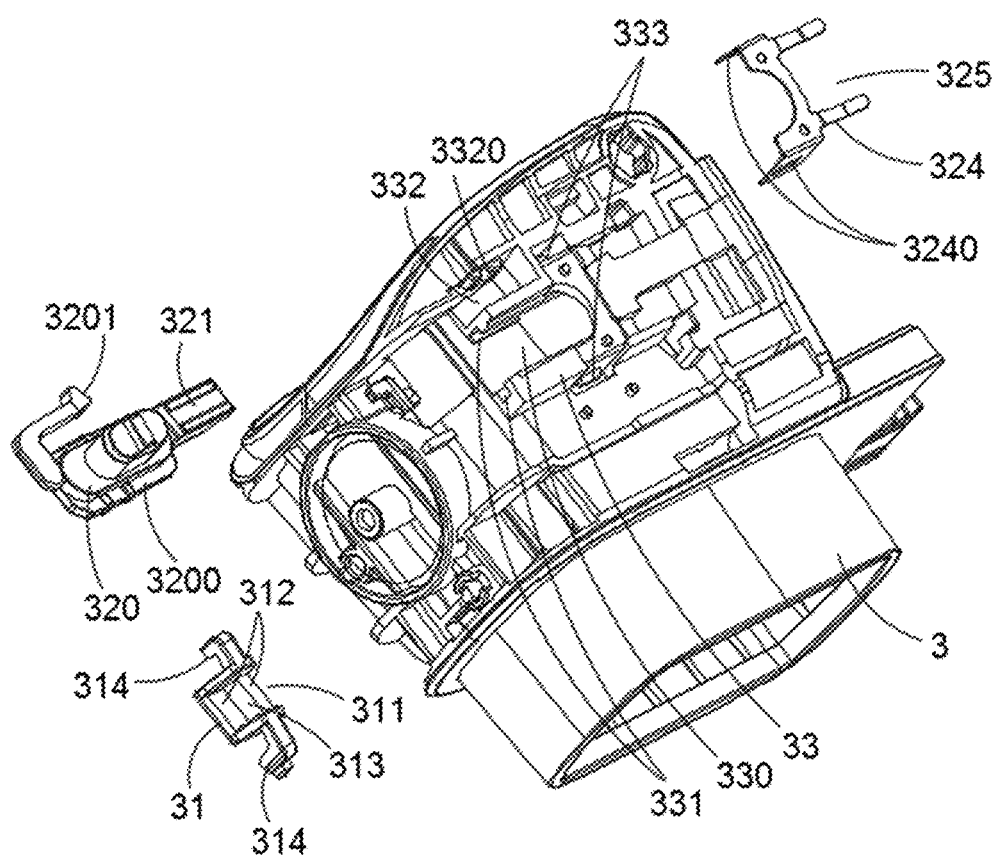
FIG. 11 is an exploded diagram of assembling a pupillary distance locking adjustment component and a left optical machine fixing frame of an open binocular near-eye display device with an adjustable pupillary distance according to a preferred embodiment of the present invention.
Figure 12:
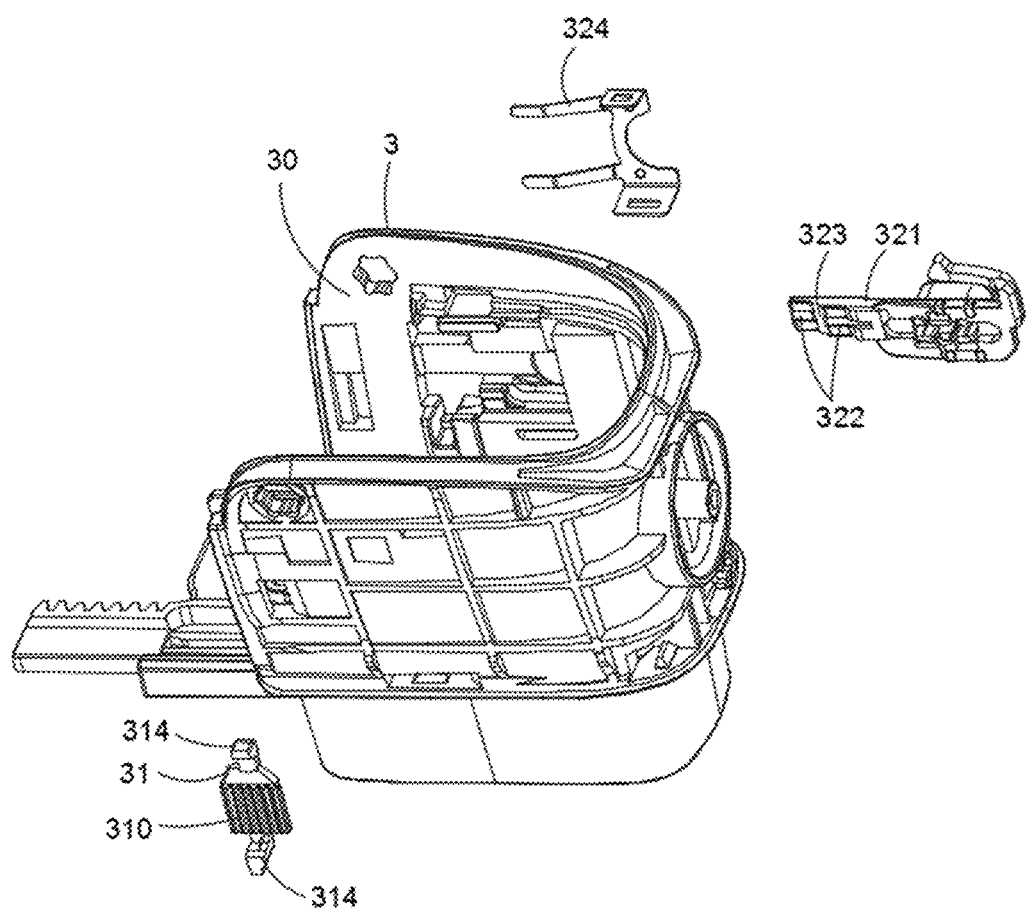
FIG. 12 is an exploded diagram of assembling a pupillary distance locking adjustment component and a left optical machine fixing frame of an open binocular near-eye display device with an adjustable pupillary distance in another perspective according to a preferred embodiment of the present invention.
Figure 13:
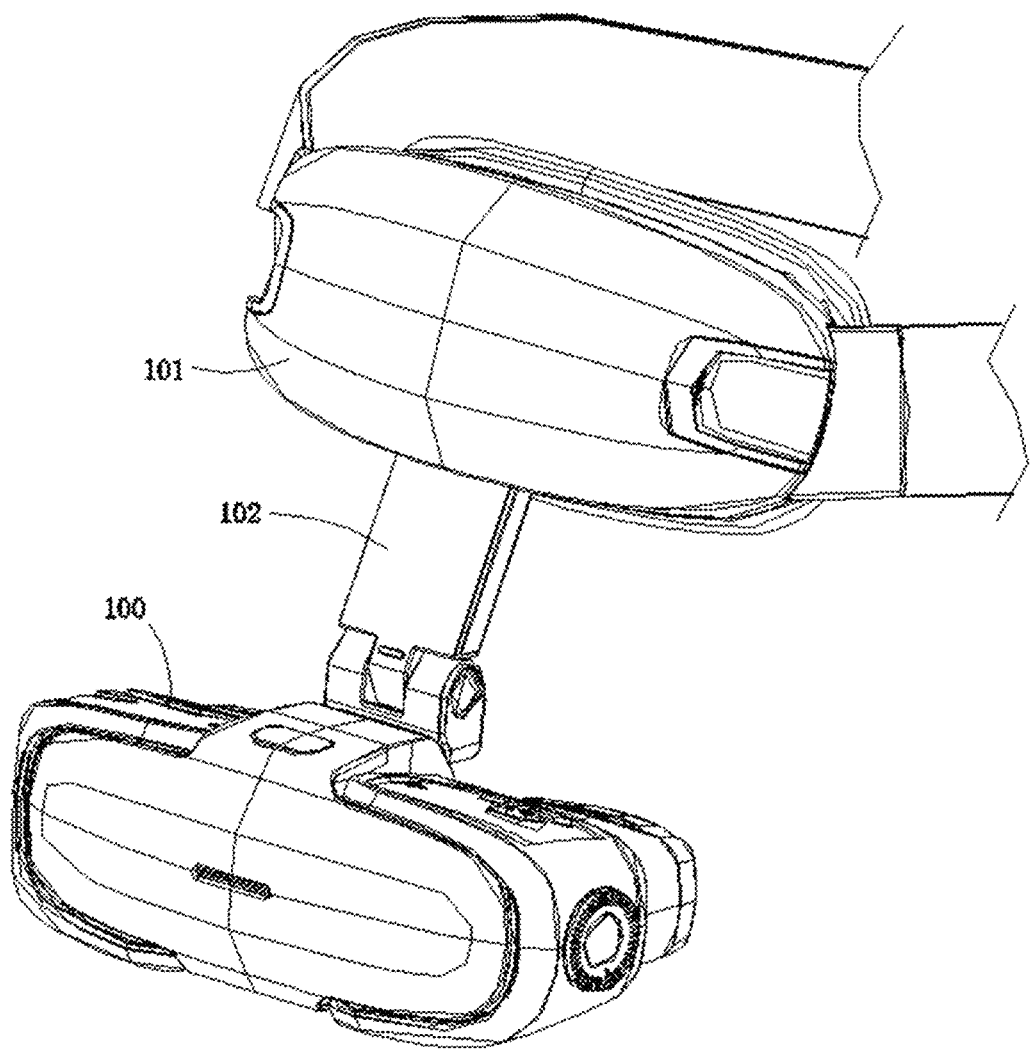
FIG. 13 is a schematic diagram of an overall structure of an open binocular near-eye display device with an adjustable pupillary distance according to a preferred embodiment of the present invention.

An open binocular near-eye display device with an adjustable pupillary distance according to a preferred embodiment of the present invention, as shown in FIG. 1 and referring to FIG. 2 to FIG. 13, includes a binocular display host 100 for both eyes to simultaneously view enlarged pictures, and a forehead support component 101 in contact with the human forehead for wearing and fixing; and further includes a flip connection mechanism 102 connecting the binocular display host and the forehead support component, and allowing the binocular display host to be in an open state with the human face during use. The binocular display host 100 includes an mounting base, a left optical machine fixing frame 3, and a right optical machine fixing frame 4. Two ends of the mounting base are respectively provided with a first mounting position and a second mounting position for movably mounting the left optical machine fixing frame 3 and the right optical machine fixing frame 4. The mounting base is provided with a distance adjustment component for adjusting a distance between the left optical machine fixing frame and the right optical machine fixing frame.

More specifically, the mounting base 100 includes a middle frame component 1 and a fixed bracket 2. The middle frame component 1 is provided with a fixing portion 10 connected to the fixed bracket 2, and position-limiting portions 11 are arranged on both sides of the fixing portion 10. The fixing portion 10 is combined with the two position-limiting portions 11 respectively to form the first mounting position that cooperates with the left optical machine fixing frame 3 and the second mounting position that cooperates with the right optical machine fixing frame 4. The fixing portion 10 is provided with an adjustment gap, or an adjustment gap is reserved between the fixed bracket 2 and the fixing portion 10. The middle frame component 1 is provided with a sliding component 9 slidably connects the left optical machine fixing frame 3 and the right optical machine fixing frame 4. The fixed bracket 2 is provided with a driving gear 20 that extends into the adjustment gap and an adjustment knob that adjusts rotation of the driving gear (using an existing structure is available). The left optical machine fixing frame 3 and the right optical machine fixing frame 4 are each provided with a rack 6 that extends into the adjustment gap. The two racks 6 are both engaged with the driving gear 20 and are located on both sides of the driving gear 20.

The fixing portion 10 and the two position-limiting portions 11 are combined to form the middle frame component 1, and the first mounting position that cooperates with the left optical machine fixing frame 3 and the second mounting position that cooperates with the right optical machine fixing frame 4 are formed by combining the fixing portion 10 and the two position-limiting portions 11, respectively. After mounting optical machines 5 on the left optical machine fixing frame 3 and the right optical machine fixing frame 4 respectively, the complement angle of the field of view on both sides of the optical machine 5 will not be blocked by a main housing of the glasses, and the surrounding environment can be perceived, thereby simplifying the frame structure, reducing production costs and overall weight, and having a small volume. In addition, the adjustment knob on the fixed bracket can be used to conveniently synchronize pupillary distances of two optical machines. Preferably, the fixing portion 10 and the two position-limiting portions 11 are combined to form a T-shaped structure, with the first mounting position and the second mounting position on both sides of the T shape. The sliding component, the driving gear, the adjustment knob, and the two racks constitute the distance adjustment component.

For aesthetic purposes, accessories such as a middle frame decoration 7 may further be arranged on the middle frame component 1, and optical machine decorations 8 may further be arranged on the left optical machine fixing frame 3 and the right optical machine fixing frame 4.

Preferably, the left optical machine fixing frame 3 and the right optical machine fixing frame 4 are each provided with a mounting slot position 30 for mounting the optical machine component. The mounting slot position 30 is arranged near an opening on one side of the fixed bracket. The two position-limiting portions 11 correspondingly extend into openings of the two mounting slot positions 30, respectively, for achieving a position-limiting function, and ensuring the stability of the left optical machine fixing frame 3 and the right optical machine fixing frame 4 in a retracted state.

Preferably, the middle frame component 1 is fixed with a pupillary distance locking rack 12, and the left optical machine fixing frame 3 or the right optical machine fixing frame 4 is provided with a pupillary distance locking pressure plate 31 and a pupillary distance locking adjustment component 32 that adjusts and switches a clutch state between the pupillary distance locking pressure plate 31 and the pupillary distance locking rack 12. The pupillary distance locking pressure plate 31 is provided with a tooth slot 310 that is engaged with the pupillary distance locking rack 12. By using the pupillary distance locking adjustment component 32 to control the clutch state between the pupillary distance locking pressure plate 31 and the pupillary distance locking rack 12, it can be relatively convenient to control the movable state of the left optical machine fixing frame 3 or the right optical machine fixing frame 4, thereby achieving control over the position locking and unlocking of the two optical machines 5. The pupillary distance locking adjustment component 32 can adopt the following structural form, or adopt an existing structure such as a gear switch. A solution obtained based on this variation in the structural form also falls within the claimed scope of the present application.

Preferably, one side surface of the pupillary distance locking pressure plate 31 is provided with the tooth slot 310, and the other side surface thereof is provided with a guide slot 311. An inner bottom of the guide slot 311 is provided with two first steps 312, and the two first steps 312 are connected by a first inclined surface 313. The pupillary distance locking adjustment component 32 includes a sliding piece 320, and the sliding piece 320 is provided with a driving head 321 that matches the guide slot 311. The driving head 321 is provided with two second steps 322, the second steps 322 correspondingly match the first steps 312, and the two second steps 322 are connected by a second inclined surface 323. The pupillary distance locking adjustment component 32 further includes a reset shrapnel 324 for resetting the pupillary distance locking pressure plate.

During implementation, by pushing the sliding piece 320 to move laterally towards the side where the pupillary distance locking pressure plate 31 is located, the driving head 321 is guided by the guide slot 311 to move. When the two first steps 312 and the two second steps 322 are attached in one-to-one correspondence, the pupillary distance locking pressure plate 31 is extruded to move downward to be engaged with the pupillary distance locking rack 12, thereby entering a locked state, and the reset shrapnel 324 is in a deformed state. When unlocking is required, the sliding piece 320 is pushed in an opposite direction to disengage the two first steps 312 and the two second steps 322 from the attached state in one-to-one correspondence. The pupillary distance locking pressure plate 31 is reset under the action of the reset shrapnel 324 and enters the unlocked state. The overall structure is reasonable and very compact, with a small volume and good reliability of the clutch drive.

Preferable, a preferred method for arranging the reset shrapnel 324 is: arranging connecting rods 314 on both sides of the pupillary distance locking pressure plate 31; and arranging an open slot 325 on an elastic action end of the reset shrapnel 324 to accommodate the pupillary distance locking pressure plate 31. Two sides of the open slot 325 are respectively connected to the two connecting rods 314, and the tooth slot 310 is located below the reset shrapnel 324. By adopting this type of shrapnel design, the positions of the pupillary distance locking pressure plate 31 and the shrapnel are relatively stable, which can effectively ensure the balance when subjected to an extrusion force, and prolong the service life of the shrapnel. The overall volume is also small and the assembling is easy. It should be noted that a conventional elastic reset component structural design can also be used, and a solution obtained based on this conventional means of replacement also falls within the claimed scope of the present application.

Preferably, a chute component 33 is arranged on the left optical machine fixing frame 3 or the right optical machine fixing frame 4, and a chute 330 is arranged on the chute component 33 to slidably connect the sliding piece 320. Both sides of the sliding piece 320 are each provided with a sliding protrusion strip 3200, and an inner wall of the chute 330 is provided with guide slots 331 that cooperate with the sliding protrusion strips 3200. The purpose of arranging the chute component 33 is to enable sliding assembling of the sliding piece 320. The stability during sliding of the sliding piece 320 can be well ensured by the cooperation of two sets of sliding protrusion strips 3200 and the guide slots 331.

Preferably, the reset shrapnel 324 connected to the chute component 33 in a clamping manner may be achieved in a manner such as arranging a clamping slot 3240 on the reset shrapnel 324 and arranging a snap 333 on the chute component 33. The connection is convenient and the whole can be assembled as a module, which is beneficial for simplifying assembling steps.

Furthermore, a tail end of the sliding piece 320 is provided with an elastic hook 3201, and a front end of the elastic hook 3201 has an orientation the same as that of a front end of the sliding piece 320. The chute component 33 is provided with a hook slot 332 that matches the elastic hook 3201, and a position-limiting slot 3320 that cooperates with the elastic hook to achieve position-limiting is arranged inside the hook slot 332. The purpose of adopting this design is that, by using the cooperation of the elastic hook 3201 and the position-limiting slot 3320, a stopping position of the sliding piece 320 can be positioned as needed.

Preferably, the sliding component 9 includes a plurality of parallel guide shafts 90, and the guide shafts 90 penetrate through the middle frame component 1. The left optical machine fixing frame 3 and the right optical machine fixing frame 4 are both provided with guide shaft sleeves or guide holes that cooperate with the guide shafts 90, so that the assembling is convenient and the cost is low. Of course, it can also be replaced with sliding forms such as slide rails. A solution obtained based on a simple transformation of this conventional structure also falls within the claimed scope of the present application.

Preferably, the fixed bracket 2 is provided with a left position-limiting column 22 and a right position-limiting column 23. The left optical machine fixing frame 3 is provided with a left position-limiting slot 34 that cooperates with the left position-limiting column 22, and the right optical machine fixing frame 4 is provided with a right position-limiting slot 40 that cooperates with the right position-limiting column 23, which is convenient to limit the maximum position of movement adjustment, easy to assemble, and structurally simple.

It should be understood that for those of ordinary skill in the art, improvements or transformations can be made based on the above description, and all these improvements and transformations should fall within the claimed scope of the claims attached to the present invention.

What is claimed is:

1. An open binocular near-eye display device with an adjustable pupillary distance, comprising a binocular display host for both eyes to simultaneously view enlarged pictures, and a forehead support component in contact with the human forehead for wearing and fixing; and further comprising a flip connection mechanism connecting the binocular display host and the forehead support component, and allowing the binocular display host to be in an open state with the human face during use; wherein the binocular display host comprises:

a mounting base, a left optical machine fixing frame, and a right optical machine fixing frame, wherein two ends of the mounting base are respectively provided with a first mounting position and a second mounting position for movably mounting the left optical machine fixing frame and the right optical machine fixing frame, and the mounting base is provided with a distance adjustment component for adjusting a distance between the left optical machine fixing frame and the right optical machine fixing frame; and the mounting base comprises a middle frame component and a fixed bracket;

the middle frame component is provided with a fixing portion connected to the fixed bracket, position-limiting portions are arranged on both sides of the fixing portion, and the fixing portion is combined with the two position-limiting portions respectively to form the first mounting position that cooperates with the left optical machine fixing frame and the second mounting position that cooperates with the right optical machine fixing frame;

the fixing portion is provided with an adjustment gap, or an adjustment gap is reserved between the fixed bracket and the fixing portion;

the middle frame component is provided with a sliding component that slidably connects the left optical machine fixing frame and the right optical machine fixing frame, the fixed bracket is provided with a driving gear that extends into the adjustment gap and an adjustment knob that adjusts rotation of the driving gear, the left optical machine fixing frame and the right optical machine fixing frame are each provided with a rack that extends into the adjustment gap, and the two racks are both engaged with the driving gear and are located on both sides of the driving gear;

the sliding component, the driving gear, the adjustment knob, and the two racks constitute the distance adjustment component; the middle frame component is fixed with a pupillary distance locking rack, and the left optical machine fixing frame or the right optical machine fixing frame is provided with a pupillary distance locking pressure plate and a pupillary distance locking adjustment component that adjusts and switches a clutch state between the pupillary distance locking pressure plate and the pupillary distance locking rack; the pupillary distance locking pressure plate is provided with a tooth slot that is engaged with the pupillary distance locking rack; one side surface of the pupillary distance locking pressure plate is provided with the tooth slot, and the other side surface thereof is provided with a guide slot; an inner bottom of the guide slot is provided with two first steps, and the two first steps are connected by a first inclined surface;

the pupillary distance locking adjustment component comprises a sliding piece, the sliding piece is provided with a driving head that matches the guide slot, the driving head is provided with two second steps, the second steps correspondingly match the first steps, and the two second steps are connected by a second inclined surface; and the pupillary distance locking adjustment component further comprises a reset shrapnel for resetting the pupillary distance locking pressure plate.

2. The open binocular near-eye display device with an adjustable pupillary distance according to claim 1, wherein both sides of the pupillary distance locking pressure plate are each provided with a connecting rod; an open slot for accommodating the pupillary distance locking pressure plate is arranged on an elastic action end of the reset shrapnel, both sides of the open slot are connected to the two connecting rods respectively, and the tooth slot is located below the reset shrapnel.

3. The open binocular near-eye display device with an adjustable pupillary distance according to claim 1, wherein a chute component is arranged on the left optical machine fixing frame or the right optical machine fixing frame, and a chute slidably connecting the sliding piece is arranged on the chute component; both sides of the sliding piece are each provided with a sliding protrusion strip, and an inner wall of the chute is provided with guide slots that cooperate with the sliding protrusion strips.

4. The open type binocular near-eye display device with an adjustable pupillary distance according to claim 3, wherein the reset shrapnel is connected to the chute component in a clamping manner; a tail end of the sliding piece is provided with an elastic hook, and a front end of the elastic hook has an orientation consistent with that of a front end of the sliding piece; the chute component is provided with a hook slot that matches the elastic hook, and a position-limiting slot that matches the elastic hook for position-limiting is arranged inside the hook slot.

5. The open binocular near-eye display device with an adjustable pupillary distance according to claim 1, wherein the left optical machine fixing frame and the right optical machine fixing frame are each provided with a mounting slot position for mounting the optical machine component, and the mounting slot position is arranged near an opening on one side of the fixed bracket; and the two position-limiting portions correspondingly extend into openings of the two mounting slot positions, respectively.

6. The open binocular near-eye display device with an adjustable pupillary distance according to claim 1, wherein the sliding component comprises a plurality of parallel guide shafts, the guide shafts penetrate through the middle frame component, and both the left optical machine fixing frame and the right optical machine fixing frame are provided with guide shaft sleeves or guide holes that cooperate with the guide shafts.

7. The open binocular near-eye display device with an adjustable pupillary distance according to claim 1, wherein the fixed bracket is provided with a left position-limiting column and a right position-limiting column; the left optical machine fixing frame is provided with a left position-limiting slot that cooperates with the left position-limiting column, and the right optical machine fixing frame is provided with a right position-limiting slot that cooperates with the right position-limiting column.

\* \* \* \* \*